US007054828B2

(12) United States Patent
Heching et al.

(10) Patent No.: US 7,054,828 B2
(45) Date of Patent: May 30, 2006

(54) COMPUTER METHOD FOR USING SAMPLE DATA TO PREDICT FUTURE POPULATION AND DOMAIN BEHAVIORS

(75) Inventors: Aliza R. Heching, Bronx, NY (US); Ramesh Inaganti, Poughkeepsie, NY (US); Ying Tat Leung, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 1108 days.

(21) Appl. No.: 09/739,637

(22) Filed: Dec. 20, 2000

(65) Prior Publication Data

US 2002/0128884 A1    Sep. 12, 2002

(51) Int. Cl.
*G06F 17/60* (2006.01)
(52) U.S. Cl. .................... 705/10; 702/179; 702/181
(58) Field of Classification Search ................ 705/10; 702/179, 181
See application file for complete search history.

(56) References Cited

U.S. PATENT DOCUMENTS

| | | | | |
|---|---|---|---|---|
| 5,740,035 | A | * | 4/1998 | Cohen et al. ................. 705/10 |
| 5,893,098 | A | * | 4/1999 | Peters et al. .................. 707/10 |
| 5,970,467 | A | * | 10/1999 | Alavi .......................... 705/10 |
| 6,189,029 | B1 | * | 2/2001 | Fuerst ........................ 709/217 |
| 6,477,504 | B1 | * | 11/2002 | Hamlin et al. ................ 705/10 |
| 6,574,585 | B1 | | 6/2003 | Caruso et al. |
| 6,613,520 | B1 | * | 9/2003 | Ashby ........................... 435/6 |
| 6,658,391 | B1 | * | 12/2003 | Williams et al. .............. 705/10 |

FOREIGN PATENT DOCUMENTS

| WO | WO 9907144 | * | 2/1999 |
|---|---|---|---|
| WO | WO 9959096 A1 | * | 11/1999 |

OTHER PUBLICATIONS

Wire feed "Oracle Acquires Data Mining Business of Thinking Machines" PR Newswire NEw York Jun. 7, 1999 p. 1-2.*
Zhu "Making bootstrap statistical inferences: A tutorial" Research Quarterly for Exercises and Sport Washington: Mar. 1997 vol. 68, Iss 1; p. 44, 12 pages.*
Carlin et al "Design of cross-sectional surveys using cluster sampling: An overview with Australian case studies"; Oct. 1999; Australian and New Aealand Journal of Public Health; vol. 23, Iss. 5; p. 546, 6 pgs.*
Rohrbach "Variance augmentation to achieve nominal coverage probability in sampling from audit populations"; Sep. 1993; Auditing. Sarasota:.*

(Continued)

*Primary Examiner*—Romain Jeanty
(74) *Attorney, Agent, or Firm*—Whitham, Curtis & Christofferson, P.C.; Stephen C. Kaufman

(57) ABSTRACT

A computer-implemented method determines current beliefs and/or behaviors of a population, and forecasts the behaviors and/or beliefs which this population is likely to have in the future. The method involves selecting a subset of members from a target population, obtaining survey responses from the members in the subset, generating point estimates of at least one population parameter, generating confidence bounds for the point estimates, and conducting a trend analysis on the survey responses and the point estimates of the at least one population parameter. Future behavior, beliefs, or other attributes of the population is then determined based on the trend analysis.

4 Claims, 1 Drawing Sheet

OTHER PUBLICATIONS

Article from the Journal of the American Statistical Association, titled: "Fine-Tuning Some Resistant Rules for Outlier Labeling" Dec. 1987 Vil. 82 No. 400. David C. Hoaglin and Boris Iglewicz.

"Ratios Involving Extreme Values" done with Office of Naval Research, by W.J. Dixon pp. 68-78.

Article from Technometrics vol. 25, No. 2 dated May 1983 titled Percentage Points for Generalized ESD Many-Outlier Procedure by Bernard Rosner at Harvard Medical School.

Douments (Outliers In Statistical Data) by Barnett School and Lewis pp. 226-230 and p. 498.

Documents (Box-and-Whiskers Plot) pp. 59-60.

* cited by examiner

COMPUTER METHOD FOR USING SAMPLE DATA TO PREDICT FUTURE POPULATION AND DOMAIN BEHAVIORS

BACKGROUND OF THE INVENTION

1. Field of the Invention

This invention generally relates to methods of statistical analysis, and more particularly to a system and method for predicting the actions, beliefs, and/or behaviors of a target population based on survey response data.

2. Description of the Related Art

Surveys are conducted to gather information which will allow an individual or corporation to make an informed decision. Many times, the information is used to gain an understanding of the beliefs and behaviors of a target population under a given set of circumstances. Responses to the survey questions, thus, provide a "snapshot in time" which reflects these current beliefs and behaviors.

The analysis of survey response data is particularly important in providing business services. Typically, businesses conduct surveys to determine the needs of their customers, and the underlying conditions which make their services desirable and valuable. This information is then used as a guide for improving the products or services or for offering new products or services. Surveys have also been used to capture public response to promotional messages from businesses, agencies, governments, and institutions.

Generally, it is difficult and costly to survey every member of a target population, i.e., to conduct a census. Therefore, polling organizations usually survey a subset (i.e., a representative sampling) of the population. Inferences about the beliefs or behaviors of the population are then drawn based on responses from the subset. To improve the accuracy of the surveys, a two-step approach is usually taken. First, a selection process or sampling methodology is used which dictates the rules by which members of the population are included in the sample. Second, an estimation process is performed for computing sample statistics that are sample estimates of population values.

Unfortunately, conventional survey methods merely attempt to interpret the past. No known survey methods exist which forecast responses or otherwise predict the future behavior patterns of a target population. A need therefore exists for a system and method for analyzing survey data which not only provides an accurate indication of past behavior of a target population, but which also establishes an accurate basis from which to determine the future likely beliefs and behavior of a target population.

SUMMARY OF THE INVENTION

It is one object of the present invention to provide a system and method for evaluating survey responses in a more meaningful way compared with conventional methods, not only to gain an improved understanding of past or current population beliefs and/or behaviors but also to forecast future population behaviors and/or beliefs.

The foregoing and other objects of the invention are achieved by a computer-implemented method for analyzing survey data, which includes selecting a subset of members from a population, obtaining survey responses from the members in the subset, generating point estimates of at least one population parameter, generating confidence bounds for the point estimates, conducting a trend analysis on the survey responses and the point estimates of the at least one population parameter, and predicting future behavior of the population based on the trend analysis. The step of selecting members from the population is preferably performed using probability sampling techniques, which may include any one of simple random sampling, systematic sampling, stratified sampling, cluster sampling, and multi-stage sampling. The population parameter(s) for which the point estimates are computed may include population mean and population proportions computed with respect to sample responses. The trend analysis may be a regression conducted over time. The invention is particularly well suited to forecasting market segmentation because, over time, market segmentation does not generally experience radical changes in direction or make-up.

DESCRIPTION OF THE PREFERRED EMBODIMENTS

Figure 1:
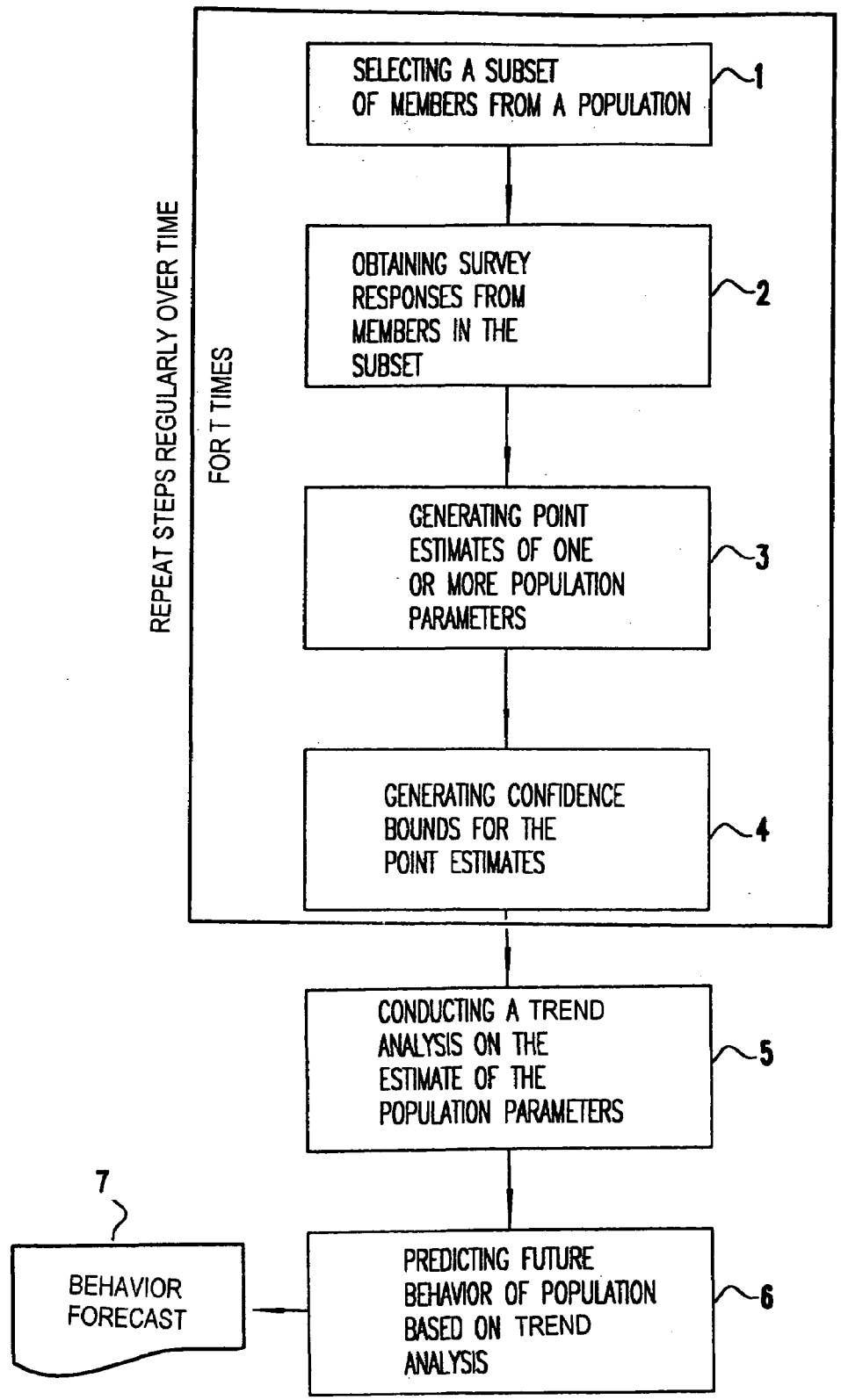
FIG. 1 is a flow diagram showing steps included in a preferred embodiment of the method of the present invention.

The present invention is a computer-implemented method for determining the current beliefs and/or behaviors of a population, and for also predicting the behaviors and/or beliefs of this population at some point in the future, thereby assisting an individual or business in a decision-making process. Referring to FIG. 1, an initial step of the method includes selecting a subset of members from a target population. (Block 1). This step may be performed by implementing probability sampling techniques, which are based on the assumption that every member in the population has some known, positive probability of being selected as a member of the subset.

In probability sampling, every member of the population has a positive probability of being selected as a member of the sample. This is not the case with non-probability sampling techniques such as cut-off sampling. For example, suppose one wants to sample business enterprises, but the smallest firms (e.g., fewer than some given number of employees) are cut off. These firms are given a zero probability of being included in the sample.

Non-probability sampling techniques include convenience sampling (select a sample based upon availability for the study), most similar/dissimilar cases sampling (select cases that are judged to be similar or dissimilar, depending upon researchers objective), typical cases (select cases that are known a priori to be useful and representative), critical cases (select cases that are essential for inclusion in and acceptance of study results), snowball sampling (current members of sample identify additional cases), and quota (interviewer selects sample that yields same proportions as population proportions on some specific variables).

In contrast to these techniques, probability sampling is characterized by all members of the population having a known positive probability of being included in the sample. These probabilities may not be the same for all members of the population, however. If all members of the population have the same probability of being selected, this sample design is called an "equal probability sampling." Five techniques for probability sampling known in the art are:

Simple random sampling: all members of population have equal probability of being selected. (In this case, if the size of the population is N and the sample size is n, then a member of the population has probability n/N of being selected as element of the sample.)

Systematic sampling: each member of the population is listed, a random start is designated, and then members of the population are selected at equal intervals.

Stratified sampling: each member of the population is assigned to a stratum. Simple random sampling is used to select within each stratum. This method of sampling is often used as a means for reducing the variance of the population parameter estimates. One stratifies, for example, so that respondents with similar characteristics are classified into the same stratum. Then, the estimated population mean (discussed below) for that stratum will have a lower variance. This will result in overall estimated population mean with lower variance.

Cluster sampling: Each member of the population is assigned to a cluster. Clusters are selected at random and then all members of the cluster are included in the sample.

Multi-stage sampling: clusters are selected as in the cluster sampling. Then sample members are selected from within each cluster, using simple random sampling.

Any of these probability sampling techniques may be used to perform the first step of the method of the present invention. By using probability sampling, one can compute the probability that a given member of the population is included in the sample (which may be referred to as the "inclusion probability" for that member of the population). The inclusion probability is then used by the present invention to make behavioral forecasts in accordance with the steps of the method which follow.

Also, it is noted that probability sampling is preferred over non-probability sampling in that its results are more valid and credible. On the other hand, it often takes longer and more effort to put together a probability sample. With probability sampling, different techniques are used for different situations. For example, cluster sampling is often used if the population is segmented into natural clusters (e.g., schools or households), and stratification may be used to decrease the variances of the sample estimates. While probability sampling techniques are preferred, if desired non-probability sampling may be used to perform the first step of the present invention.

The second step includes obtaining survey responses from the members in the subset. (Block 2). Survey responses may be collected in various ways, including interview studies such as telephone or personal interviews, self-administered surveys such as mail surveys or handed/picked up/dropped off questionnaires, and electronic surveys such as direct entry into computer, modem, e mail, fax, disk, Internet. Another approach may involve collecting "responses" from some records on file (e.g., sample of size of homes in given region (by looking at the county records), to make general statements about size of homes in that region).

Once collected, the responses, or data, is preferably stored in a database. The database can either be a fixed-field type (data for each variable in same field location for each respondent) or a free-field type (data for each variable in the same order for each respondent; delimiters, e.g., comma or blank, separate one variable from the next). Preferably, one field or group of fields is used that uniquely identifies each respondent (e.g. assign sample number to each respondent. Each record will then have a field with this assigned number in that field.)

The third step includes generating point estimates of one or more population parameters.(Block 3). Point estimates estimate a specific value of a population parameter. Generating a correct point estimate depends on the method used to collect the sample. For example, if stratified sampling was used, then the population parameter estimates must be computed using formulas that adjust for stratified sampling.

The population parameter(s) may include the mean of the population or a population ratio with respect to a given survey question. If population mean is selected, an estimate may be determined as follows. First, sample data is collected, which may include a number of different sets of sample responses, e.g., sample 1, sample 2, . . . , sample n. No conclusions about this sample data, however, are drawn. Instead, the sample data is used as a basis for making a statement about the overall population mean. Specifically, each of these samples is used to compute an estimate (e.g., a point estimate) of some population parameter, e.g., the population mean. (Of course, the estimate computed may not be identical for each sample, and there is no assurance that any of these estimates is actually exactly equal to the population mean.) Computation of the point estimates is described in greater detail in the discussion which follows concerning the computation of confidence bounds.

The fourth step includes generating confidence bounds for the point estimates generated for the population parameters. (Block 4). Initially, it is noted that there is a difference between confidence intervals and confidence bounds in the context of the invention. A confidence interval refers to the interval which, with a specified degree of confidence (expressed as a percentage), contains the true value of the population parameter. A "confidence bound," on the other hand, corresponds to upper or lower limits (or bounds) which delimit or define a confidence interval.

In computing a confidence interval, an interval is placed around the sample statistic (i.e., the value of the population parameter estimated based upon the sample) that specifies the likely range within which the population parameter will fall. For example, a 95% confidence interval means that we are 95% confident that the true value for the population mean lies between the upper and lower bound of the confidence interval.

A specific example illustrating this concept is as follows. We sample n elements from a population of size s. For each element, we ask a question, say: "what is your annual income?" Now, we want to answer the question: "What is the average annual income for the entire population?" We want to answer this question for the entire population (size N) based upon the n responses collected. Assuming that simple random sampling was used (the formulas are different for each different sampling technique employed), a point estimate of the population mean (population average annual income) is computed as follows:

(1) Let $\pi_K$ inclusion probability for element k, where k=1 , . . . , n.

(2) Let $y_K$=the value for element k (in this case $y_K$ is the annual income reported by respondent k), where k=1, . . . n.

Then, a point estimate of the population mean, $\tilde{y}_S$, is computed as:

$$\tilde{y}_s = \frac{\sum_{k \in s} \frac{y_k}{\pi_k}}{\sum_{k \in s} \frac{1}{\pi_k}}$$

However, as mentioned earlier, this is the point estimate for the population mean based upon the respondents in sample s. If a different sample is chosen, say $s_1$, a different point estimate of the population mean will probably result. And probably neither of these is actually the true value of the population mean.

To obtain a better measure of the true value of the population mean, a confidence interval is constructed. As an example, this confidence interval may be a 95% confidence interval, i.e., an interval which indicates with 95% confidence that the true value for the population mean lies within the bounds of the confidence interval. This confidence interval may be constructed as follows.

First, the variance of the estimator is measured. Let $\theta$ denote population mean and $\hat{\theta}$ denote estimate of population mean. The variance of the estimator is defined as the E($\tilde{y}_s - E(\hat{\theta}))^2$, where E is the expected value function. So, the variance is a measure of how the point estimate for each sample differs from the expected point estimate based upon all samples. More specifically, let S=set of all possible samples. Then, $$E(\hat{\theta}) = \sum_{s \in S} p(s) \tilde{y}_s,$$

where p(s) is the probability that sample s is selected from the set of all possible samples in S, and $$v(\hat{\theta}) = \sum_{s \in S} p(s) \{\tilde{y}_s - E(\hat{\theta})\}^2.$$

Of course, based upon one sample, we cannot compute $v(\hat{\theta})$ because this requires knowledge of $\tilde{y}_s$ for all samples $s \in S$. So instead we must estimate $v(\hat{\theta})$ similar to the way that we estimate $\hat{\theta}$ by $\tilde{y}_s$. In the case of simple random sampling, we estimate $v(\hat{\theta})$ by $v(\tilde{y}_s)$ as follows:

(1) Let $$\hat{N} = \sum_{k \in S} \left(\frac{1}{\pi_k}\right),$$

where $\hat{N}$ is an estimate of the size of the population.

(2) Let $\Delta kl = \pi kl - \pi k \pi l$. (Recall $\pi_k$ is the probability that element k is included in the sample; and $\pi_{kl}$ is the probability that both k and l are included in the sample.)

(3) Let $$\ddot{\Delta}_{kl} = \frac{\Delta_{kl}}{\pi_{kl}}$$

Then, $$v(\tilde{y}_s) = \frac{1}{\hat{N}^2} \sum_{k \in S} \sum_{l \in S} \ddot{\Delta}_{kl} \left(\frac{y_k - \tilde{y}_s}{\pi_k}\right)\left(\frac{y_l - \tilde{y}_s}{\pi_l}\right).$$

The lower bound of the confidence interval is defined as $$\tilde{y}_s - \left(z_{1-\frac{\alpha}{2}}(v(\tilde{y}_s))\right)^{\frac{1}{2}}$$

and the upper bound of the confidence interval is defined by $$\tilde{y}_s + z_{1-\frac{\alpha}{2}}(v(\tilde{y}_s))^{\frac{1}{2}}$$

where $$z_{1-\frac{\alpha}{2}}$$

is the constant exceeded with probability $\alpha/2$ by the N(0,1) distribution.

(N(0,1) is a normal distribution with mean zero and standard deviation 1.)

In performing the above steps, and specifically the third step of the invention, various factors may be taken into consideration. These factors include, for example, what stratification scheme was used when the sample was created and any weights associated with each respondent.

Stratification Schemes.

Stratified sampling classifies the population elements into sub-populations, or strata, and samples separately from each stratum. A stratification scheme defines the set of one or more characteristics based upon which the population is stratified. For example, suppose that one wishes to sample students from a particular school. One can then stratify the students according to which grade they are in, and then sample from within each stratum.

If a stratification scheme is used in accordance with the present invention, this will impact the first, third, and fourth steps of the invention discussed above. The first step will be impacted, for example, because this stratification scheme will be used to do the sampling. The third step will be impacted because different formulas exist to compute point estimates based upon the different sampling scheme used. So if stratified sampling is used, the correct formulas must be used to compute the point estimates. The fourth step will be affected in a secondary fashion, because the correct point estimates must be incorporated into the computations for the confidence bounds. However, the general formula for confidence bounds will remain unchanged.

Weights.

The survey responses may be weighted. These weights may be computed by first understanding that these weights are often some value that is estimated by the individual who is analyzing the survey, or by some executive who is interested in the survey results. Often these weights will be computed in such a way to assign greater "importance" to responses of certain respondents with given characteristics. For example, suppose that a company wishes to estimate how sales will grow in the upcoming year. Perhaps the company will distribute a survey containing the question: "In the upcoming year, by what percent do you expect your purchases to increase over the previous year?" The analyst/company may decide to weight the responses by, for example, average sales volume for that respondent in the previous five years. In this way, the analyst/company is putting more weight on the responses provided by respondents/customers who traditionally have had higher purchase volume.

The weights are then incorporated in all the estimation formulas. One example for incorporating weights in a formula for determining a point estimate of population mean is as follows. Suppose the population was sampled using stratified sampling, and we wish to estimate the population mean based upon the sample responses. Then, the estimated population mean may be computed as follows:

Let $w_k$=weight assigned to respondent k, where k=1, ..., n $N_h$=size of population in stratum h, wherein h=1, ..., H $n_h$=sample size for stratum h, where h=1, ..., h, and $y_k$=value of response for respondent k, where k=1, ..., n.

Then, the formula for estimating population mean is:

$$\frac{\sum_{h=1}^{H} \left(\frac{N_h}{n_h}\right) \sum_{k \in h} w_k y_k}{\sum_{h=1}^{H} \left(\frac{N_h}{n_h}\right) \sum_{k \in h} w_k}$$

Often, one will place greater weight on some sample observations. For example, consider the case where a manufacturing company is considering introducing a new product to the market. It can choose one of three products to introduce, and wants to survey a sample of its customers to determine which product customers prefer. In this case, the company may wish to place greater weight on responses of customers who have traditionally represented larger account customers, on the supposition that these customers will purchase in larger quantities, and therefore it is most profitable to produce products that are preferred by these customers. One may assign different weights for responses to different questions for the same observation (customer).

Also, one may consider whether an estimate of the behavior of the entire population is desired, or just a sub-population. For example, suppose this same manufacturing company only wants to study preferences of customers who have not recently made purchases (e.g., in the past year), on the supposition that this customer probably has more funds available for new purchases. Then, this subset of customers that have not made purchases in the last year represents a subset, or domain, of the entire population of customers.

In estimating the behavior of the entire population, we conduct a survey by sampling the population and collecting the responses of those respondents in the sample. However, we want to make statements about the population at large. So we do not want to say something like "the members of this sample generally prefer red over blue," for example. Rather, we wish to be able to say something like "the members of the population from which this sample was selected prefer red over blue." These tools may be used to make statements about the population rather than restricting ourselves to statements about the sample members.

For sub-population estimates, it is often the case in a survey that estimates are needed not only for the population as a whole, but also for various sub-populations or domains. For example, suppose one is conducting a survey of households. The survey statistician may be asked to provide separate estimates for each of a number of types of households. So the spirit of estimation remains the same here, i.e., sample responses are used to make statements about the larger population. However, in this case the survey statistician will make statements regarding each of the domains of interest. More specifically, the survey statistician will make separate statements about the population of each type of household. Therefore, sometimes it is desired to make statements about the entire population, and sometimes we want to make statements only about some sub-population, or domain, of the entire population.

The fifth step includes conducting a trend analysis on the computed estimate of the population mean. (Block 5). Preferably, in performing this step, it is an objective to use the survey responses not only as a tool for identifying current beliefs and behaviors of the population, but also to detect trends in population behaviors so that future beliefs, behaviors, actions, and/or attitudes of the population may be predicted. Just how far in the future the present invention makes predictions depends upon the time unit used when collecting survey responses. For example, if the survey is administered every month, a prediction of the estimated population mean for a specific question/variable mean for the next month or couple of months can be made.

The steps used to perform this trend analysis are as follows. Here, we use the computed estimates of the population parameter (e.g., mean) to compute the trends. We compute trend analysis by looking at responses to a single question over time. So if a survey is administered multiple times, and the same question is asked each time the survey is administered, then we can perform trend analysis on the response to this question. And, as stated above, the general methodology involves first computing the estimated mean each time the survey was administered (using step 3) and then testing for trends/differences in these means using the method outlined below.

The trend analysis performed in the fifth step may be performed where there are at least three data points available. This trend analysis involves conducting a regression over time. This regression analysis may then be used to forecast future estimated parameter values, thus forming the basis of predicting population behavior. Sometimes, parameter estimates are constrained to lie within a given range of values. The present invention incorporates these constraints into the trend analysis as follows.

Step A.

For each repetition of the survey, compute the estimated population mean for that repetition. The following variables are applicable:

t the index of repetition of survey (e.g., survey was conducted T times, where t=1, 2, ... T and T is the total number of times the survey was repeated);

y=the response variable of interest;

$\bar{y}_t$=the estimated population mean for survey repetition t ($\bar{y}_t$ is computed using the third step of the present invention).

Step B.

Next, perform a regression to forecast $\bar{y}_{T+i}$ ($i \geq 1$) as follows. Two situations may apply: (1) $\bar{y}_{T+i}$ $(i \geq 1)$ is unconstrained, i.e., its value is not constrained to lie within a given range, and (2) $\bar{y}_{T+i}$ ($i \geq 1$) is constrained.

For the case where $\bar{y}_{T+i}$ ($i \geq 1$) is unconstrained, regression of the estimated population mean against time is as $\bar{y}_t$=a+bt. So, if we have T repetitions of the survey, then we have T equations:

$\bar{y}_1 = a+b$ $\bar{y}_2 = a+2b$

.

.

$\bar{y}_T = a+Tb$

Standard regression techniques may be used to solve for the least squares estimates for a and b, denoted by â and b̂. Thus, the following regression formula is produced:

$$\hat{y}_t = \hat{a} + \hat{b}t \quad (1)$$

For the case where $\hat{y}_{T+i}$ ($i \geq 1$) is constrained, regression of the estimated population mean against time may be performed according to the following example. Suppose that the percentages of men and woman that will be in the population at the time T+1 is trying to be forecast. Then:

$\bar{y}_{T+1}{}^M$=estimated percentage of men in the entire population in period T+1

$\bar{y}_{T+1}{}^W$=estimated percentage of woman in the entire population in period T+1.

Clearly, $\bar{y}_{T+1}{}^M + \bar{y}_{T+1}{}^W = 100\%$. So, the forecasted values are constrained by the fact that the percentage of men plus the percentage of woman, combined, must equal 100%. No more and no less.

In view of this constraint, regression equations may be formed as follows:

$$\bar{y}_{w1} = a_w + b_w \qquad \bar{y}_{M1} = a_M + b_M$$
$$\bar{y}_{w2} = a_w + 2b_w \qquad \bar{y}_{M2} = a_M + 2b_M$$
$$\vdots \qquad\qquad \vdots$$
$$\bar{y}_{wT} = a_w + Tb_w \qquad \bar{y}_{MT} = a_M + Tb_M$$

where $\bar{y}_{wt}$, t=1, ..., T=estimated percentage of women in the population at time t and $\bar{y}_{Mt}$, t=1, ..., T=estimated percentage of men in the population at time t.

Further, we define the following set of constraints:

$$\bar{y}_{W1} + \bar{y}_{M1} = 100$$

$$\bar{y}_{W2} + \bar{y}_{M2} = 100$$

•

•

•

$$\bar{y}_{WT} \bar{y}_{MT} = 100$$

Now, the task is to find $a_w$, $b_w$, $a_M$, and $b_M$ that assures that $\bar{y}_{WT} + \bar{y}_{MT} = 100$ over time. More generally, suppose that there are p variables of interest (not only M+W), for which there are:

$$y_{it} = a_i + b_i t, \text{ where } i=1, \ldots, p \quad (2)$$

$$\sum_{t=1}^{p} y_{it} = k, \text{ where } t = 1, \ldots, T. \quad (3)$$

One must find the estimates for parameters $a_1$, and $b_1$, in equation (2), subject to the constraints in equation (3). Suppose for t=1, we have:

$$\sum y_{i1} = k \quad (4)$$

$$y_{i1} = a_i + b_i$$

-continued $$\sum_{i=1}^{p} y_{i1} = k \Rightarrow \sum_{i=1}^{p} (a_i + b_i) = k$$

For t=2:

$$y_{i2} = a_i + 2b_i \quad (5)$$

$$\sum_{i=1}^{p} y_{i2} = k \Rightarrow \sum_{i=1}^{p} (a_i + b_i + b_i) = k$$

Incorporating (1) into (2), we have:

$$k + \sum_{i=1}^{p} b_i = k \quad (6)$$

Here, equation (6) implies that $$\sum_{i=1}^{p} b_i = 0.$$

For t=3:

$$y_{i3} = a_i + 3b_i \quad (7)$$

$$\sum_{i=1}^{p} y_{i3} = k \Rightarrow \sum_{i=1}^{p} (a_i + b_i + b_i + b_i) = k$$

Incorporating equation (5) into equation (7) produces:

$$k + \sum_{i=1}^{p} b_i = k$$

implying again that:

$$\Sigma b_i = 0 \quad (8)$$

Equation (5) is equivalent to:

$$b_p = -\sum_{i=1}^{p-1} b_i \quad (9)$$

Define the following indicator variables:

$$I_i = \begin{cases} 1 & \text{if data point is variable } i \\ 0 & \text{otherwise, where } i = 1, \ldots, p \end{cases}$$

Having defined these indicator variables, the $y_{it}$ expressions can be replaced with the following single expression:

$$y_t = \sum_{i=1}^{p} I_i(a_i + b_i t)$$

$$= \sum_{i=1}^{p} a_i I_i + \sum_{i=1}^{p} I_i b_i t$$

$$= \sum_{i=1}^{p} a_i I_i + \sum_{i=1}^{p-1} I_i b_i t + \left(-\sum_{i=1}^{p-1} b_i\right) I_p t$$

$$= \sum_{i=1}^{p} a_i I_i + \sum_{i=1}^{p-1} b_i (I_i t - I_p t)$$

The regression equation in accordance with the present invention is the last equation above, with independent variables $I_i$ and $(I_i t - I_p t)$. The dependent variable is $y_t$, which is the estimated population mean at time t. The regression equation can be re-written as:

$$y_t = a'_o + \sum_{i=2}^{p} a'_i I_i + \sum_{i=1}^{p-1} b'_i (I_i t - I_p t)$$

After completing the regression to determine the least squares estimates for $a_0'$, $a_i'$ (i=2, ..., p) and $b_i'$ (i=1, ..., p-1), we determine $a_i$ (i=1, ..., p) and $b_i$ (i=i, ..., p) as follows:

$a_i = a_0'$
$a_i = a_0' + a_i'$, where i=2, ..., p
$b_i = b_i'$, where i=1, ..., p-1

$$b_p = -\sum_{i=1}^{p-1} b_i$$

Thus, the following regression formula is produced:

$y_{it} = a_i + b_i t$, where i=1, ..., p      (10)

Regression equations (1) and (10) may be used in two ways.

First, the trend of $y_{it}$ (the estimate of the population mean) is determined over time. This may be done as follows. Standard hypothesis testing to test $H_0 = b_i = 0$. If this null hypothesis is rejected, then it can be said that the variable t (time) does impact $y_{it}$. Then, if:

$b_i > 0$, $y_{it}$ is increasing over time
$b_i < 0$, $y_{it}$ is increasing over time If the null hypothesis is not rejected, then $y_{it}$ is not changing over time.

The sixth step includes predicting future behavior of the population based on the trend analysis.(Step 6). This prediction step is performed based on whether the regression in the fifth step was constrained or unconstrained. Suppose that t is in monthly time units. The regression in the fifth step may be used as a model to forecast, for example, the next month's (time period T+1) estimated population mean ($\bar{y}_{T+1}$) by replacing parameter t with the value T+1 in equation (1), i.e., estimated $\bar{y}_{T+1} = \hat{a} + \hat{b}(T+1)$, if the predicted values are unconstrained.

If the predicted values are constrained, the next month's (time period T+1) estimated population mean for variable p ($y_{pt}$) is computed by replacing parameter t with the value T+1 in equation (10), i.e., $y_{p,T+1} = a_p + b_p(T+1)$.

EXAMPLE

The method of the present invention may be more clearly understood with respect to the real-world example which follows. The method begins by stratifying a population of customers according to two criteria: 1) geographical location of company headquarters and 2) number of employees. A subset, or domain, of the population is then formed to include those respondents who answered "yes" to the question: "Are you planning to increase your computer capacity in the upcoming year?"

Next, simple random sampling is used within each stratum, where a sample size n=5 is selected.

Within the survey, the company asks a number of questions including the following:

1. In the upcoming year, what percent of your computer capacity do you plan to use for usage type A?
2. In the upcoming year, what percent of your computer capacity do you plan to use for usage type B?
3. In the upcoming year, what percent of your computer capacity do you plan to use for usage type C?
4. In the upcoming year, what percent of your computer capacity do you plan to use for usage types other than A, B, and C?

The responses to these questions are variables of interest, which may be denoted as A, B, C, and D, respectively.

For each of these variables, the estimate of the population mean is computed in accordance with third step of the present invention as well as the variance of the estimates and the confidence bounds. These estimates and bounds are computed as follows.

Estimates of the population mean for a sample size $n_{sd}$:

For each variable, i=A, B, C, and D, estimate the population mean according to the following formula:

$$\tilde{y}_i = \frac{\sum_{h=1}^{H} \frac{N_h}{n_h} \sum_{k \in s_{dh}} y_{ik}}{\sum_{h=1}^{H} \frac{N_h}{n_h} n_{s_{dh}}}$$

where $N_h$ = size of population in stratum h, where h=1, ..., H
$n_h$ = size of sample in stratum h, where h=1, ..., H
$s_{dh}$ = sample that is in stratum h and in domain d (domain d=responded "yes" to question), where h=1, ..., H
$n_{s_{dh}}$ = count of number of observations in stratum h that lie in domain d, where h=1, ..., H
$y_{ik}$ = value of variable i as reported by respondent k, where i=A, B, C, and D and where k=1, ..., $n_{s_{dh}}$.

Variance of estimates of the population mean for sample size $n_{s_{dh}}$:

For each variable i=A, B, C, and D $$\hat{v}_i(\tilde{y}_i) = \left(\frac{1}{\hat{N}_d^2}\right) \sum_{h=1}^{H} N_h^2 \cdot \frac{1 - f_h}{n_h} \cdot$$

-continued
$$\frac{\sum_{k \in s_{dh}} (y_{ik} - \bar{y}_{is_{dh}})^2 + n_{s_{dh}}(1 - p_{dh})(\bar{y}_{is_{dh}} - \bar{y}_i)^2}{n_h - 1}$$

where:

$$\hat{N}_d = \sum_{h=1}^{H} N_h \left(\frac{n_{s_{dh}}}{n_h}\right) = \text{population size of domain } d$$

$$f_h = \frac{n_h}{N_h} = \text{sampling fraction in stratum } h,$$

where h=1, . . . , H $$\bar{y}_{is_{dh}} = \frac{\sum_{k \in s_{dh}} y_{ik}}{n_{s_{dh}}} = \text{average of } y_i \text{ in stratum } h,$$

where h=1, . . . , H and i=A, B, C, and D.

$$p_{dh} = \frac{n_{s_{dh}}}{n_h} = \text{fraction of sample in stratum } h \text{ that lies in domain } d,$$

where h=1, . . . , H.

As far as confidence bounds are concerned, 95% confidence bounds on estimates of population means is as follows: With 95% confidence, we can say that true population mean for variable i, $\hat{\theta}_i$, where i=A, B, C, and D, lies within the following range:

$(\bar{y}_i - 1.96\sqrt{\hat{v}_i(\bar{y}_i)}, \bar{y}_i + 1.96\sqrt{\hat{v}_i(\bar{y}_i)})$, where i=A, B, C, and D This entire process is repeated four times at times t=1, 2, 3, and 4. The time unit is one year, i.e., a survey once a year for four years.

To make predictions of the estimate of the population mean in some point in time, the means of each of these variables are subjected to a regression analysis, with time as the independent variable. Note that the sum of the estimates of the population means are constrained as A+B+C+D=100%. Also, the variables may be weighted by the reciprocal of the variance for each observation. This will adjust for variability in the estimated population mean and give lesser weight to estimates that have greater variability (and are thus less precise). This regression analysis is performed in accordance with the invention as mentioned above, which may be as follows:

$$y_t = a_0' + \sum_{i=B}^{D} a_i' I_i + \sum_{i=A}^{C} b_i'(I_i t - I_D t)$$

where
   $y_t$=the estimate of population mean $I_1 = 1$  if data point is for variable $i$ $\quad\quad 0$  otherwise, $i = A, B, C,$ and $D$ t=time period The regression equations for each variable i=A, B, C, and D are:

$\tilde{y}_i = a_i + b_i t$, where i =A, B,C, and D and where the $a_i$ and $b_i$ parameters are determined by:
$a_A = a_0'$
$a_i = a_0' + a_i$, where i=B, C, and D
$b_i = b_i'$ $$b_D = -\sum_{i=A}^{C} b_i$$

Once the parameters of the regression equation are determined, hypothesis tests may be performed on the coefficient of the independent variable t (time) for each of the dependent variables. If the hypothesis test indicates that these coefficients are not equal to zero, this indicates that there is a change in these estimated population means over time. In this case, if the coefficient is positive, then the estimated population means are increasing over time. If the coefficient is negative, then the estimated population means are decreasing over time. This hypothesis test is performed as follows:
$H_0 = b_i = 0$
$H_1 = b_i \neq 0$
Reject null hypothesis if $$\frac{b_i}{stderr(b_i)} > t_{n,\frac{\alpha}{2}}$$

where α=0.05 for 95% confidence, and $t_{n,\frac{\alpha}{2}}$ is the t-statistic with n degrees of freedom. The standard error is defined by $stderr(b_i') = \sqrt{var(b_i)}$ where $var(b_i) = var\ b_i'$ for i=A, B, and C and $$var(b_d) = \sum_{i=A}^{C} var(b_i') + 2\sum_{j=A}^{C}\sum_{k=A}^{C} cor(b_j', b_k').$$

After this hypothesis test is completed, the regression equation is used to forecast future estimates of the population mean by inserting the desired value for t (time) into the regression equation. For example, if we want to forecast the estimate of the population mean for variable A in period 5, the following formula would be used:

$Y_{A5} = a_A + 5b_A.$

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

We claim:

1. A computer implemented method for analyzing survey data, comprising:
   (a) selecting a subset of members from a population using probability sampling techniques;
   (b) obtaining survey responses from the members in said subset and storing said results in an electronic database;
   (c) generating point estimates of at least one population parameter, including a response to a chosen question in the survey, using a computer processor to compute said point estimates from said survey responses stored in said electronic database;
   (d) generating confidence bounds for said point estimates using said computer processor;
   (e) conducting a trend analysis on the point estimates of said at least one populations parameter using said computer processor; wherein the trend analysis is a regular least square regression or a weighted least square regression performed over a predetermined period of time, and wherein said weighted least square regression results are inversely proportional to the variance of point estimates of the population parameter obtained in said generating of point estimates of at least one population parameter steps and generating confidence bounds for said estimates step, and
   (f) predicting future survey responses of said population based on said trend analysis by calculating a forecast of future values of said population parameter(s) using said computer processor, and
   wherein said selecting a subset of members from a population step, said obtaining survey responses from the members in said subset step, said generating point estimates of at least one population parameter step, and said generating confidence bounds for said point estimates step are repeated a number of times over regular time intervals.

2. The method of claim 1, wherein said population parameter is one of population mean and population variance.

3. The method of claim 1, further comprising:
   weighting the survey responses to assign greater importance to responses of preselected respondents.

4. The method of claim 1, wherein said point estimates are constrained by predetermined amount based on at least one of a set of known characteristics of said population.

* * * * *